United States Patent [19]
Eichler et al.

[11] Patent Number: 5,855,184
[45] Date of Patent: Jan. 5, 1999

[54] ANIMAL FEEDING DEVICE AND SUPPORT

[75] Inventors: Richard Eichler; Jack Looney, both of Napa, Calif.

[73] Assignee: Lixit Corporation, Napa, Calif.

[21] Appl. No.: 975,454

[22] Filed: Nov. 21, 1997

[51] Int. Cl.[6] .............................. A01K 5/01; A01K 39/00
[52] U.S. Cl. ............................... 119/51.5; 119/61; 119/74
[58] Field of Search .......................... 119/51.5, 61, 74, 119/72, 59

[56] References Cited

U.S. PATENT DOCUMENTS

| | | | |
|---|---|---|---|
| 1,647,069 | 10/1927 | Ahlman ..................... | 119/61 |
| 1,881,065 | 10/1932 | Shirley ..................... | 119/61 |
| 2,658,709 | 11/1953 | Kendall ..................... | 119/61 |
| 2,675,782 | 4/1954 | Lage ..................... | 119/61 |
| 3,205,861 | 9/1965 | Moore ..................... | 119/61 |
| 4,011,951 | 3/1977 | Boyer ..................... | 119/61 X |
| 4,204,501 | 5/1980 | Karlsson et al. ..................... | 119/72 |
| 5,144,912 | 9/1992 | Hammett et al. ..................... | 119/61 |
| 5,421,289 | 6/1995 | Capellaro ..................... | 119/72 |
| 5,566,639 | 10/1996 | McKinstry et al. ..................... | 119/74 X |

*Primary Examiner*—Michael J. Carone
*Assistant Examiner*—Yvonne R. Abbott
*Attorney, Agent, or Firm*—Harris Zimmerman

[57] ABSTRACT

An apparatus for feeding or watering animals within cages includes a food container having an upwardly opening, cup-shaped configuration, and a cantilever bracket for supporting the container. The container includes a closed curved sidewall and integral bottom wall, and a connector assembly extending downwardly from the outer surface of the bottom wall. The connector assembly includes a generally cylindrical lug having one end secured to the bottom wall, and a locking bar extending diametrically and secured to the other end of the lug. The locking bar includes opposed rounded ends that extend outwardly of the lug. The cantilever bracket includes a distal end having a web with a top surface, and an opening formed in the top surface to receive the connector assembly. The opening comprises a cylindrical hole dimensioned to receive the cylindrical lug in close tolerance fit, and a pair of radially extending, diametrically opposed slots radiating from the hole and dimensioned to receive the locking bar. The locking bar and lug may be inserted into the opening, the locking bar extending completely through the slots. The container may be rotated about the axis of the cylindrical lug, whereby the ends of the locking bar impinge on the underside of the web of the bracket. The bottom surface of the container impinges on the top surface of the web, preventing any substantial movement of the container with respect to the bracket. A detent feature secures the container and prevent removal of the container by any likely animal interaction.

8 Claims, 3 Drawing Sheets

ANIMAL FEEDING DEVICE AND SUPPORT

BACKGROUND OF THE INVENTION

The present invention relates to a device for supplying food to pets, and more particularly to a an assembly for feeding caged animals.

Animals that are kept in cages, such as pets or laboratory animals, are sustained by food and water provided in containers within the cage. Food is typically provided in feeding cups or containers that are secured to the cage wall to be available to the animals. The support for the food container may comprise wire or hooks or a bracket secured to the wires of a cage wall. Often the container is supported gravitally in a receptacle formed by the wire support or by the bracket. This arrangement facilitates easy removal and replacement of the container.

In a laboratory setting where hundreds or thousands of animals must be fed daily, removing and replacing the food container in the cage of each animal comprises substantial labor, and the ongoing cost of labor involved in sustaining the animals is a considerable cost. Therefore, a small savings in the effort required to handle each food container can result in significant savings. However, the food and water containers must be prevented from spilling their contents inside the cage, since spilled food can spoil and cause disease, and spilled water can also promote disease.

It has been observed that caged small animals, such as rats, hamsters, gerbils, or rabbits, for example, tend to exhibit typical rodent behavior and gnaw and chew on whatever objects are accessible. Larger caged animals will also gnaw, chew, and prod available objects due to lack of exercise and boredom. Many cage feeding devices rely on wire attachments or bails to secure feeding devices to wire cage walls. These arrangements lack the rigidity necessary to prevent animals from shaking, tipping, and spilling the contents of the feeding containers. These activities waste food, which spills on the cage floor and fouls the cage. In controlled experiments where food intake is an important variable, the wasted food can comprise a source of error in the experimental results.

SUMMARY OF THE INVENTION

The present invention generally comprises a device for feeding or watering animals within cages. A salient feature of the device is a support bracket that secures the food container against upset or spillage by the animal, yet is easily removed and replaced for daily maintenance of the animal.

The invention is comprised of a food container having an upwardly opening, cup-shaped configuration, and a cantilever bracket for supporting the container. The container includes a closed curved sidewall and integral bottom wall, and a connector assembly extending downwardly from the outer surface of the bottom wall. The connector assembly includes a generally cylindrical lug having one end secured to the bottom wall, and a locking bar extending diametrically and secured to the other end of the lug. The locking bar includes opposed rounded ends that extend outwardly of the lug.

The cantilever bracket includes a distal end having a web with a top surface, and an opening formed in the top surface that is adapted to receive the connector assembly. The opening comprises a cylindrical hole dimensioned to receive the cylindrical lug in close tolerance fit, and a pair of radially extending, diametrically opposed slots radiating from the hole and dimensioned to receive the locking bar. The locking bar and lug may be inserted into the opening, the locking bar extending completely through the slots. The container may be rotated about the axis of the cylindrical lug, whereby the ends of the locking bar impinge on the underside of the web of the bracket. The bottom surface of the container impinges on the top surface of the web, preventing any substantial movement of the container with respect to the bracket.

The underside of the web is provided with a detent feature that projects into the rotation path of one end of the locking bar, and creates a slight over-center effect with the one end. The locking bar may be urged past the over-center location of the detent feature to secure the container and prevent removal of the container by any likely animal interaction. However, simple manual grasping and rotating of the container can remove it from the cantilever bracket with little effort, so that removal and replacement may be carried out with a minimum of time and labor.

The cantilever bracket further includes a proximal end having a clamping assembly adapted to be secured to a wire mesh wall or wire mesh window of an animal cage. The proximal end of the cantilever bracket includes a receptacle surrounding a mounting hole extending therethrough. A pair of clamping pads include confronting surfaces, each having a parallel grooved array to engage the wires of a cage wall or cage window. The opposed surfaces of the clamping pads each include a raised key that is shaped to be received in the receptacle in the cantilever bracket in more than one angular relationship. A screw hole is provided in each clamping pad, extending from the grooved surface through the raised key at the opposed side.

The key is shaped so that the clamping pads may be secured to the cantilever bracket in at least two different angular relationships about the common axis of the mounting hole and screw holes. This feature permits the clamping assembly to be adapted, e.g., to engage wires extending horizontally or vertically in a cage wall or window.

DESCRIPTION OF THE PREFERRED EMBODIMENT

Figure 6:
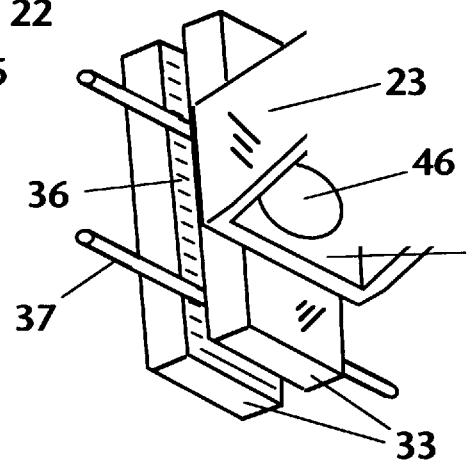
FIG. 6 is a fragmentary perspective view showing an alternative orientation of the clamping assembly of the present invention.

The present invention generally comprises a device for feeding or watering animals within cages. With regard to FIG. 6, the invention broadly includes a food or water container 11 having an upwardly opening, cup-like shape, and a cantilever bracket 12 for releasably supporting the container 11. A locking assembly 14 firmly secures the container 11 to the bracket 12 to prevent tipping of the container, while permitting easy removal and replacement of the container. In addition, a clamping assembly 13 engages the wire mesh of a wall or window of an animal cage to secure the cantilever bracket and container within the animal cage.

Figure 1:
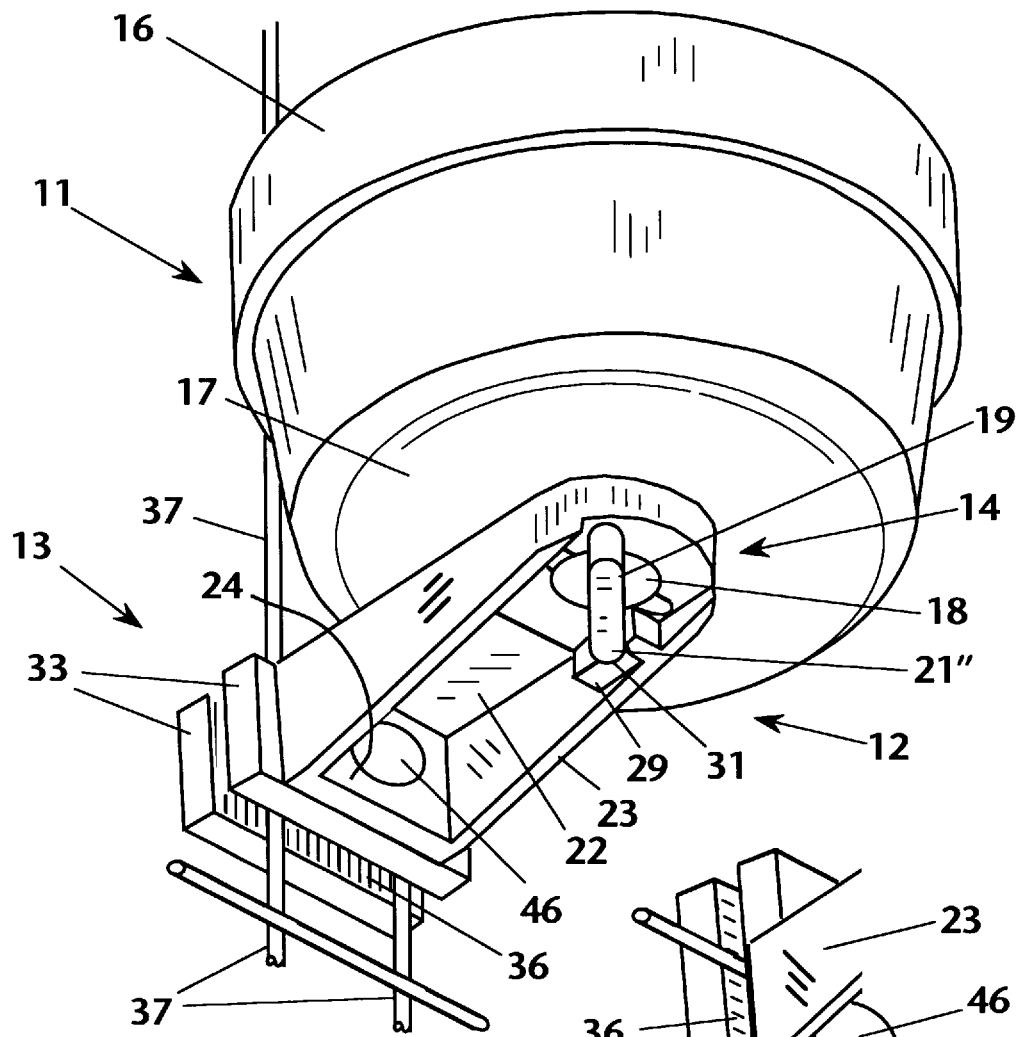
FIG. 1 is a perspective view of the animal feeding device and cantilever bracket of the present invention.
Figures 2, 3, 4:
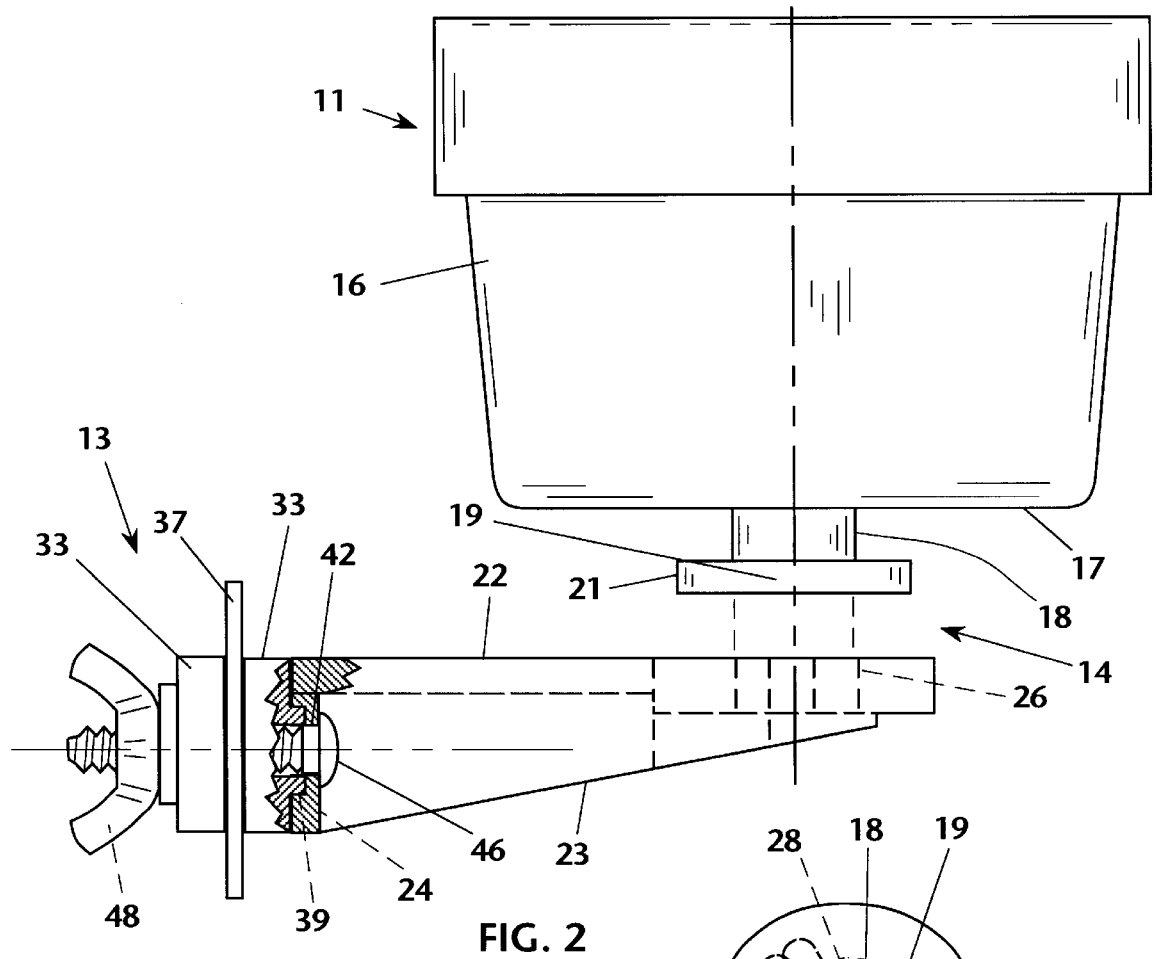
FIG. 2 is a side elevation of the animal feeding device and cantilever bracket shown in FIG. 1.
FIG. 3 is a proximal end view of the cantilever bracket of the present invention.
FIG. 4 is a bottom view of the distal end of the cantilever bracket of the present invention.
Figure 5:
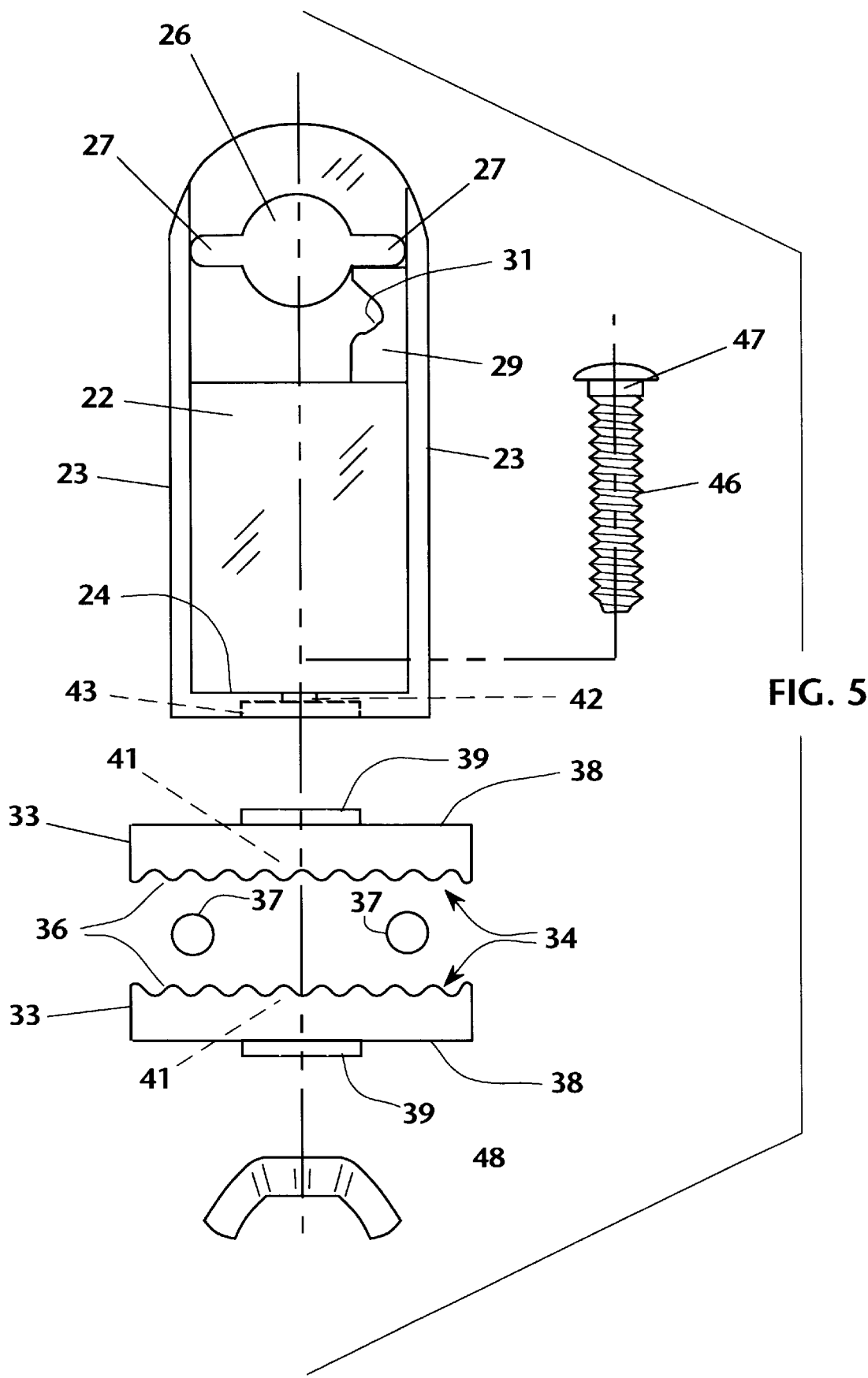
FIG. 5 is an exploded plan view of the cantilever bracket and clamping assembly of the present invention.

With regard to FIGS. 1 and 2, the container 11 includes a closed curved sidewall 16 and a bottom end wall 17 forming the cup-like configuration. Although a tapered cylindrical form is shown, any convenient symmetrical or non-symmetrical shape may be used. Extending downwardly from the end wall 17 is a cylindrical lug 13, which may be disposed coaxially or eccentrically with respect to the curved shape of the sidewall 16. A locking bar 19 is secured to the lower end face of the lug 18 and extending diametrically thereto, the opposed ends 21 of the locking bar extending radially outwardly from the lug 18. The ends 21 of the locking bar are smoothly rounded or radiused.

With regard to FIGS. 1–5, the cantilever bracket 12 generally includes a laterally extending web 22 and a pair of integral tapered side struts 23 extending transversely therefrom. A proximal end wall 24 extends generally transverse to the web 22 and joins the proximal ends of the side struts 23 to form a unitary rigid support frame for the web 22. Disposed in the distal end portion of the web 22 is a cylindrical opening 26 dimensioned to receive the lug 18 therethrough in close tolerance rotating fashion. The thickness of the web 22 is substantially equal to the length of the lug 18, whereby the lug may extend entirely through the opening 26. The opening 26 further includes a pair of radially extending, diametrically opposed slots 27 radiating from the hole and dimensioned to receive the locking bar 21 in a close tolerance sliding fit. The locking bar 19 and lug 18 may be inserted fully into the opening 26, so that the locking bar extending completely through the slots 27 and the bottom surface 17 of the container impinges on the web 22. The locking bar 19 is symmetrical with respect to the opening 26, so that the bar 19 may be inserted through the slots 27 without preference for the 0° or 180° orientation of the locking bar to the slots 27.

The container 11 may be rotated about the axis of the cylindrical lug 18, whereby the ends of the locking bar 19 impinge on an annular land portion 28 on the underside of the web 22. The web 22 is thus tightly and rigidly engaged between the locking bar and the bottom surface of the container, thereby preventing any substantial movement of the container 11 with respect to the bracket 12 despite the depredations of the animal within the cage.

The bracket further includes a detent arrangement to prevent accidental rotation and possible release of the container 11 from the bracket 12. A detent boss 29 is secured to the bottom surface of the web 22 adjacent to the opening 26 and one slot 27. The boss 29 is disposed in the rotational path of one end 21 of the locking bar 19, as shown in FIG. 4. A groove 31 formed in the boss 29 is dimensioned to receive the rounded end 21 of the bar 19 with a slight over-center interference fit, so that the end 21 may be rotated to the interference position 21' and then snapped into the position 21'', where it is retained. Simple manual grasping and counter-rotating of the container 11 can remove it from the cantilever bracket with little effort, so that removal and replacement may be carried out with a minimum of time and labor. However, no animal activity can likely counterrotate the container. Thus the container is latched in place and cannot be dislodged.

With regard to FIGS. 1–3 and 5, the clamping assembly 13 includes a pair of clamping pads 33, comprising generally rectangular objects having confronting surfaces 36. The surfaces 36 are provided with a parallel array of shallow grooves adapted to engage wires 37 of a cage wall or window, as shown in FIG. 1. Protruding from each of the opposed surfaces 38 is a square key 39. Each pad 33 further includes a screw hole 41 extending from surface 36 through the pad and centered within the square key 39.

Extending through the proximal end wall 24 of the cantilever bracket 12 is a mounting hole 21, which comprises a square opening. A keyway or receptacle 43 extends into the outer surface of end wall 24, and is centered about the square hole 41. The keyway 43 is also square, and is dimensioned to receive a key 39 in close tolerance, releasable fit. Due to the fact that the key 39 may be received in the keyway receptacle 43 at any of four orthogonal relationships to the end wall, the clamping pads 33 may be oriented as shown in FIG. 1, or, alternatively, in FIG. 6. The grooved surfaces 36 may be selectively oriented to be parallel to the cage wires or rods available at the desired location for installation of the invention within a cage. It may be appreciated that the key 39 and keyway 43 may be shaped in complementary fashion in many regular and irregular geometric shapes to yield any desired angular relationship of the clamping pads to the end wall 24, so that any expected angular support may be engaged in the most effective fashion.

A screw 46 is dimensioned to extend through the mounting hole 42 and screw holes 41 of the clamping pads, and to be engaged by wing nut 48. The screw 46 is provided with a square shoulder 47 that is received in the square hole 42 in close tolerance fit, whereby it is prevented from rotating with respect to the bracket 12. The wing nut is tightened to compress the pads 33 together so that the grooved surfaces 36 may engage the wires 37 rigidly and securely, while at the same time securing the key 39 in the keyway and immobilizing the bracket 12 with respect to the clamping pads. The bracket 12 is thus rigidly secured to the cage wall or window, and the container 11 is supported with great stability. The casual or deliberate actions of the animal within the cage cannot dislodge the clamping assembly 13, nor can they move the container with respect to the cantilever bracket 12.

It may be appreciated that a plurality of brackets 12 may be installed in the living areas of an animal care facility, and a plurality of containers 11 used to supply food and/or water or other substances to the animals. The containers may be removed and replaced on a regular basis, the used containers being cleaned and refilled before being returned to use and reinstalled in the brackets 12.

All of the components of the invention described herein, except the screw and wing nut, may be fabricated of plastic or resin materials, such as PVC or ABS plastic, polystyrene, recycled mixed plastic feed stock, or the like.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

We claim:

1. An apparatus for feeding an animal, including:
   container means for supplying food and water to an animal, said container means including a container having a closed curved sidewall and a bottom end wall;
   bracket means for supporting said container means;
   locking means for releasably joining said container means to said bracket means, said locking means including a lug extending downwardly from said bottom end wall and disposed coaxially with a rotational axis of said container;

clamping means for supporting said bracket means;

a locking bar secured to a lower end surface of said lug, said locking bar extending transversely to said rotational axis, said locking bar including at least one opposed end extending outwardly from said lug;

said bracket means including a transverse web portion, and an opening extending through said web portion adapted to receive said lug and said locking bar, said opening including a cylindrical hole, and a pair of slots extending radially and disposed diametrically in said cylindrical hole, said slots dimensioned to receive therethrough said at least one opposed end of said locking bar, said cylindrical hole dimensioned to receive said lug therethrough, said lug being received in freely rotating fashion in said cylindrical hole, whereby said locking bar may be rotated with said lug to rotate said at least one opposed end of said locking bar to a disposition in which it impinges on bottom surface portions of said web portion; and, detent means for releasably retaining said locking bar in an angular orientation about said axis that is non-aligned with said slots of said opening.

2. The apparatus of claim 1, wherein said detent means includes a detent boss disposed in the rotational path of said at least one opposed end.

3. The apparatus of claim 2, further including a groove formed in said boss and disposed to admit said at least one opposed end.

4. The apparatus of claim 3, further including a surface portion of said groove disposed to engage a portion of said at least one opposed end in a slight interference fit to retain said locking bar in said groove.

5. An apparatus for feeding an animal, including:

container means for supplying food and water to an animal;

bracket means for supporting said container means;

locking means for releasably joining said container means to said bracket means;

clamping means for supporting said bracket means, said bracket means including a cantilever bracket, said cantilever bracket including a distal portion disposed to support said container means and a proximal portion joined to said clamping means;

said clamping means including at least one clamping pad, and means for compressively joining said at least one clamping pad to said proximal portion to clamp a support structure therebetween;

said means for compressively joining including a screw extending proximally from said proximal portion of said bracket, and a pair of clamping pads having confronting surfaces in close proximity, said screw extending through said clamping pads, said proximal portion including a proximal end face, and further including a polygonal keyway extending into said proximal end face.

6. The apparatus of claim 5, wherein at least one of said clamping pads includes a polygonal key extending from a surface thereof, said polygonal key formed in complementary-fit fashion to said polygonal keyway.

7. An apparatus for feeding an animal, including:

a container having a bottom wall, a lug extending downwardly from said lower wall, and a locking bar secured to a distal end of said lug;

a bracket for supporting said container, said bracket including a transverse web portion, an opening extending through said transverse web portion, said opening including a central opening and a pair of slots extending therefrom in diametrical opposition, said central opening dimensioned to receive said lug therethrough and said slots dimensioned to receive said locking bar therethrough, said lug and locking bar being rotatable from a first position in which said lug extends through said central opening and said locking bar is aligned with said pair of slots, whereby said lug and locking bar may be inserted or removed from said opening, to a second position in which said lug extends through said central opening and said locking bar is not aligned with said pair of slots, whereby said locking bar secures said container to said transverse web portion.

8. The apparatus of claim 7, further including detent means on a lower surface portion of said transverse web portion for releasably retaining said locking bar in said second position.

* * * * *